United States Patent [19]

Shouda

[11] Patent Number: 4,924,382
[45] Date of Patent: May 8, 1990

[54] DEBUGGING MICROPROCESSOR CAPABLE OF SWITCHING BETWEEN EMULATION AND MONITOR WITHOUT ACCESSING STACK AREA

[75] Inventor: Masahiro Shouda, Tokyo, Japan

[73] Assignee: NEC Corporation, Tokyo, Japan

[21] Appl. No.: 253,479

[22] Filed: Oct. 5, 1988

[30] Foreign Application Priority Data

Oct. 5, 1987 [JP] Japan ................. 62-251273

[51] Int. Cl.$^5$ .......................... G06F 13/00
[52] U.S. Cl. ................... 364/200; 364/251.3; 364/267.91; 364/960.2
[58] Field of Search ............ 364/200, 900 MS File; 371/16

[56] References Cited

U.S. PATENT DOCUMENTS

| | | | |
|---|---|---|---|
| 3,373,408 | 3/1968 | Ling ........................ | 364/200 |
| 4,128,878 | 12/1978 | Yasuhara et al. ............ | 364/200 |
| 4,167,781 | 9/1979 | Beccia et al. .............. | 364/200 |
| 4,255,786 | 3/1981 | Holtey et al. .............. | 364/200 |
| 4,636,945 | 1/1987 | Tanagawa et al. ............ | 364/200 |
| 4,670,838 | 6/1987 | Kawata ..................... | 364/200 |

Primary Examiner—Gareth D. Shaw
Assistant Examiner—Gopal C. Ray
Attorney, Agent, or Firm—Foley & Lardner, Schwartz, Jeffery, Schwaab, Mack, Blumenthal & Evans

[57] ABSTRACT

A debugging microprocessor used in an in-circuit emulator is made to be capable of moving into a debugging interrupt processing execution mode in response to an external supervisor interrupt instruction. This debugging microprocessor comprises a first program counter put in an operating condition when the microprocessor is in a user's program execution mode, a second program counter put in an operating condition when the microprocessor is in a debugging interrupt processing execution mode, and a program counter controller responding to the external supervisor interrupt instruction to cause a content of the second program counter to be outputted as a program counter value. The program counter controller also responds to a return instruction to cause a content of the first program counter to be outputted as a program counter value. Thus, the content of the first program counter can be accessed in the course of the debugging interrupt processing execution.

4 Claims, 5 Drawing Sheets

DEBUGGING MICROPROCESSOR CAPABLE OF SWITCHING BETWEEN EMULATION AND MONITOR WITHOUT ACCESSING STACK AREA

BACKGROUND OF THE INVENTION

1. Field of the invention

The present invention relates to improvement of the internal processings in debugging microprocessors, and more specifically to improvement of the processings in debugging microprocessors at the time of a debugging interrupt.

2. Description of related art

Hitherto, as a tool for development of systems and programs, a so-called "in-circuit emulator" has been widely used. This in-circuit emulator is ordinarily made such that an operation mode transfer from the execution of a user's program (called the "emulation mode" hereinafter) to the execution of a supervisor interrupt program (called the "monitor mode" hereinafter) is performed by the supervisor interrupt to an emulation microprocessor. Further, the transfer from monitor mode to emulation mode is performed by a return instruction.

Here, referring to FIG. 1, there is diagrammatically shown the construction of a typical, conventional debugging processor generally used as the above mentioned emulation microprocessor. The shown debugging processor generally indicated by Reference Numeral 10 includes, similarly to ordinary processors (CPUs), an arithmetic logic unit (ALU) 12, a data bus controller 14, a register group 16 including a stack pointer (SP) area therein, and an instruction register 18, which are coupled to an internal bus 20. The register group 16 is also coupled through an address path 22 to an address controller 24. To the internal bus 22 an emulation program counter (PC) 26 is also coupled, which is in turn coupled to the address controller 24 through a program counter (PC) path 28. The instruction register 18 is coupled to an instruction decode/CPU controller 30. Furthermore, the data bus controller 14 is coupled to an data bus 32, and the address controller 24 is coupled to an address bus 34. The instruction decoder/CPU controller 30 is coupled to a control bus 36. Through this control bus 36, there are supplied various control signals including a status signal, a read signal and a write signal for a memory, and also, a supervisor interrupt signal and an acknowledge signal in resonse thereto, etc.

When the above mentioned debugging microprocessor acknowledges the supervisor interrupt request signal, the debugging microprocessor generates an acknowledge signal and moves into a monitor mode. At this time, in order to preserve the status of various elements when the emulation is stopped, it is necessary to save the contents of the emulation PC 26, a program status word (PSW) in the register group 16 and the like, to a stack area within a memory managed by a monitor. The reason for this is that the PC, PSW and others used in the emulation mode are also used in the monitor mode for execution of a given program, and therefore, if the contents of the PC, PSW and others were not preserved, the status at the time of the emulation mode stop becomes unknown, namely it becomes impossible to restart the emulation mode in response to a return instruction. Furthermore, if the saved data of the PC, PSW and others are modified, it is possible to restart the emulation mode from any desired condition.

The following is one example of a sequence for going to an interrupt operation in the above mentioned conventional debugging microprocessor.

| (a) | (SP-1) ← PSW |
| | (SP-2) ← PC |
| | SP ← SP-2 |
| | PC ← INTERRUPT VECTOR |
| (b) | PC ← (SP) |
| | PSW ← (SP + 1) |
| | SP ← (SP + 2) |
| (c) | EMUL: BRKRET |
| | INT1: CMP ACC, 0H |
| | JR NZ, EMUL |

Namely, the contents of PSW and PC are saved in a stack area in the memory designated by the SP, and it goes to the monitor of the address indicated by a supervisor interrupt vector. In the case of executing an instruction for returning from the monitor mode to the emulation mode, the data of the stack is returned to the PC and PSW as shown in the above (b), and then the emulation mode is restarted.

In general, the in-circuit emulator is such that all the memory space of the microprocessor is made open to the user in the course of the emulation mode and on the other hand all the contents of the user's memory must be preserved in the course of the monitor mode. Therefore, the debugging microprocessor is ordinarily switched to access the user's memory in the course of the emulation mode and the debug memory in the course of the monitor mode.

In the conventional debugging microprocessor 10 as mentioned above, therefore, when the mode is transferred from the emulation mode to the monitor mode by the supervisor interrupt, the contents of the PC, PSW and others are saved in a memory area designated by the SP. In addition, the in-circuit emulator switches the memory from the user's memory to the debug memory in response to a supervisor interrupt acknowledge signal. At this time, however, since the SP of the debugging microprocessor has assumed any unknown value in the process of the emulation mode, it is impossible to know where a stack area is formed within the debug memory. Therefore, it is necessary to forcibly set a save area in a predetermined area. Namely, the SP address is outputted from the address bus of the debugging microprocessor into the debug memory at the time of saving, but the control must be performed in such a manner that this address is not actually supplied to the debug memory, and an substituted address indicative of a predetermined save area is supplied to the debug memory.

Similarly, when the mode is switched from the monitor mode to the emulation mode by a return instruction as a result of the supervisor interrupt processing, the address must be switched so as to return the content of the save area of the debug memory to the PC, PSW and others so that the emulation mode can be restarted.

FIG. 2 diagrammatically illustrates a save address control section provided in a conventional in-circuit emulator which uses the conventional debugging microprocessor.

The shown save address control section of the in-circuit emulator includes the debugging microprocessor 10 and a user's memory 40 coupled through the address bus 34 to the debugging microprocessor 10. To the address bus 34, there is also coupled an address selector 42, which is in turn coupled to receive a save address from a save address generator 44. An output of the address selector 42 is coupled to a debug memory 46. The shown save address control section further includes a timing controller 48 coupled to the control bus 36 to receive the control signal from the debugging microprocessor 10. This timing controller 48 outputs an address control signal to the save address generator 44 and also an ENABLE signal to the debug memory 46. This ENABLE signal is inverted by an inverter 50 and the inverted ENABLE signal is applied to the user's memory 40. Further, the timing controller 48 generates a select signal for controlling the address selector 42.

In the above mentioned address control section, if the timing controller 48 detects the supervisor interrupt acknowledge signal, the controller 48 generates the select signal supplied to the address selector 42 so that the save address generated by the save address generator 44 is supplied through the address selector 42 to the debug memory 46. Furthermore, the timing controller 48 activates the ENABLE signal to the debug memory 46 so that the debug memory 46 is enabled. On the other hand, since the inverted ENABLE signal is inputted to the user's memory 40, the user's memory 40 is disabled.

If the save operation is started, the timing controller 48 generates the address control signal supplied to the save address generator 44 to cause the save address generator 44 to decrement the save address signal, so that the contents of the PC, PSW and others are sequentially saved in a memory area designated by the decrementing save address signal. After the save operator has been completed, the timing controller 48 controls the address selector 42 so that the address on the address bus 34 is supplied to the debug memory 46. In addition, at the time of executing the return instruction, the save address generated by the save address generator 44 is supplied to the debug memory 46 so that the contents of the designated areas in the debug memory 46 are returned to the PC, PSW and others. Thereafter, the execution of the program of the user's memory is restarted. In other words, the emulation mode is restarted.

As seen from the above, if the in-circuit emulator uses the debugging microprocessor 10 shown in FIG. 1, the address selector 42, the save address generator 44 and the timing controller 48 are indispensable to the save address control section, and therefore, the supervisor interrupt control is very complicated.

In addition, in the case that the in-circuit emulator executes an emulation operation in which the emulation mode is stopped when an accumulator becomes "0", a supervisor interrupt signal is generated for the debugging microprocessor at every time occurrence of each instruction. Accordingly, as the steps (a)→(c)→(b) as mentioned above, the save of the contents of the PC, PSW and others, the check of the content of the accumulator and the return of the saved contents of the PC, PSW and others must be executed at every time occurrence of each instruction. As a result, the execution speed of the emulation mode is very much reduced.

SUMMARY OF THE INVENTION

Accordingly, it is an object of the present invention to provide a debugging microprocessor which overcomes the above mentioned defect of the conventional one.

Another object of the present invention is to provide a debugging microprocessor capable of simplifying the control of the supervisor interrupt so that a one-step continuous execution speed of the emulation is increased.

A further object of the present invention is to provide a debugging microprocessor capable of executing the mode transfer between the emulation mode and the monitor mode without requiring special access to any memory so that the mode transfer can be realized at a high speed.

The above and other objects of the present invention are achieved in accordance with the present invention by a debugging microprocessor capable of moving into a debugging interrupt processing execution mode in response to an external supervisor interrupt instruction, comprising a first program counter put in an operating condition when the microprocessor is in a user's program execution mode, a second program counter put in an operating condition when the microprocessor is in a debugging interrupt processing execution mode, and a program counter controller responding to the external supervisor interrupt instruction to cause the content of the second program counter to be outputted as a program counter value, and also responding to a return instruction to cause the content of the first program counter to be outputted as a program counter value, so that the content of the first program counter can be accessed in the course of the debugging interrupt operation.

The above and other objects, features and advantages of the present invention will be apparent from the following description of preferred embodiments of the invention with reference to the accompanying drawings.

DESCRIPTION OF THE PREFERRED EMBODIMENTS

Figure 3:
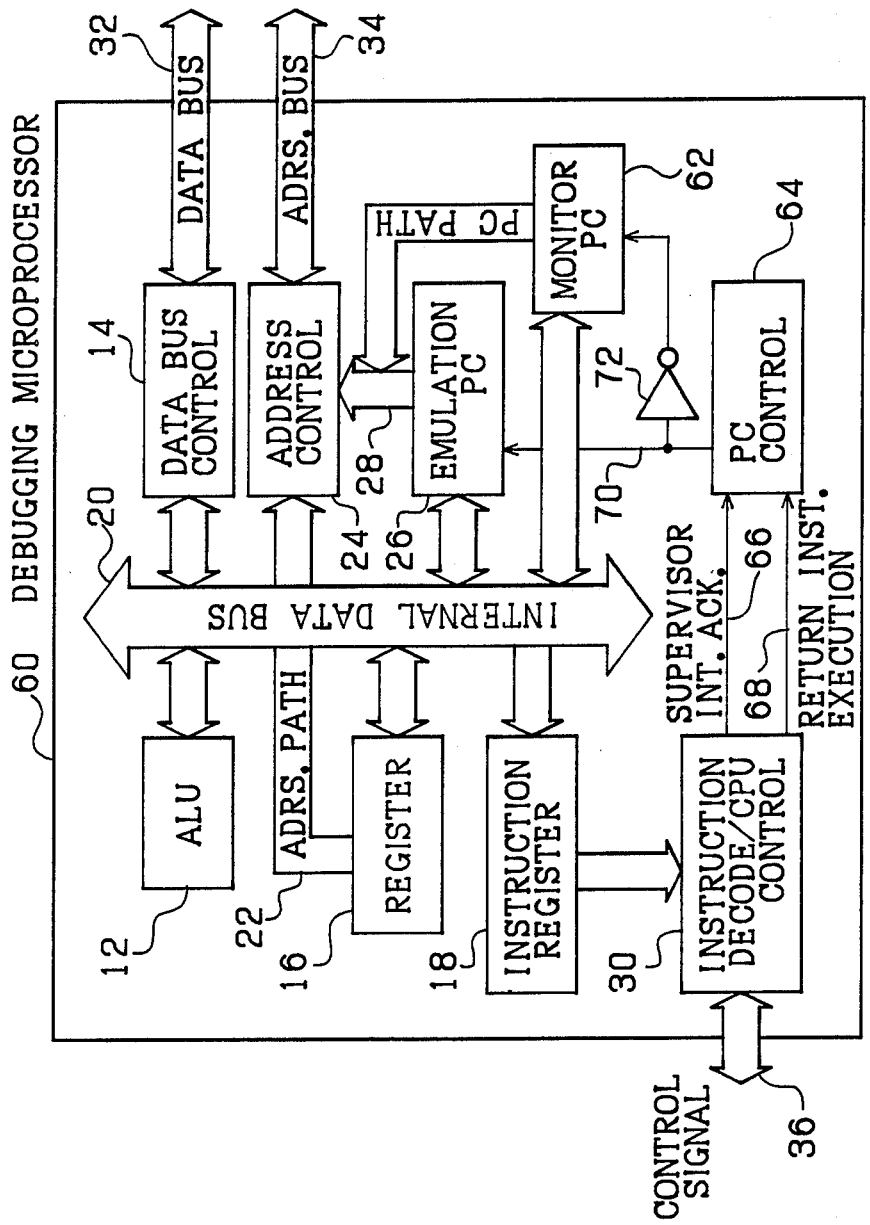
FIG. 3 is a block diagram of one embodiment of the debugging microprocessor in accordance with the present invention.

Referring to FIG. 3, there is shown a block diagram of one embodiment of the debugging microprocessor in accordance with the present invention. In FIG. 3, elements similar or corresponding to those shown in FIG. 1 are given the same reference numerals, and explanation thereof will be omitted.

Figure 1:
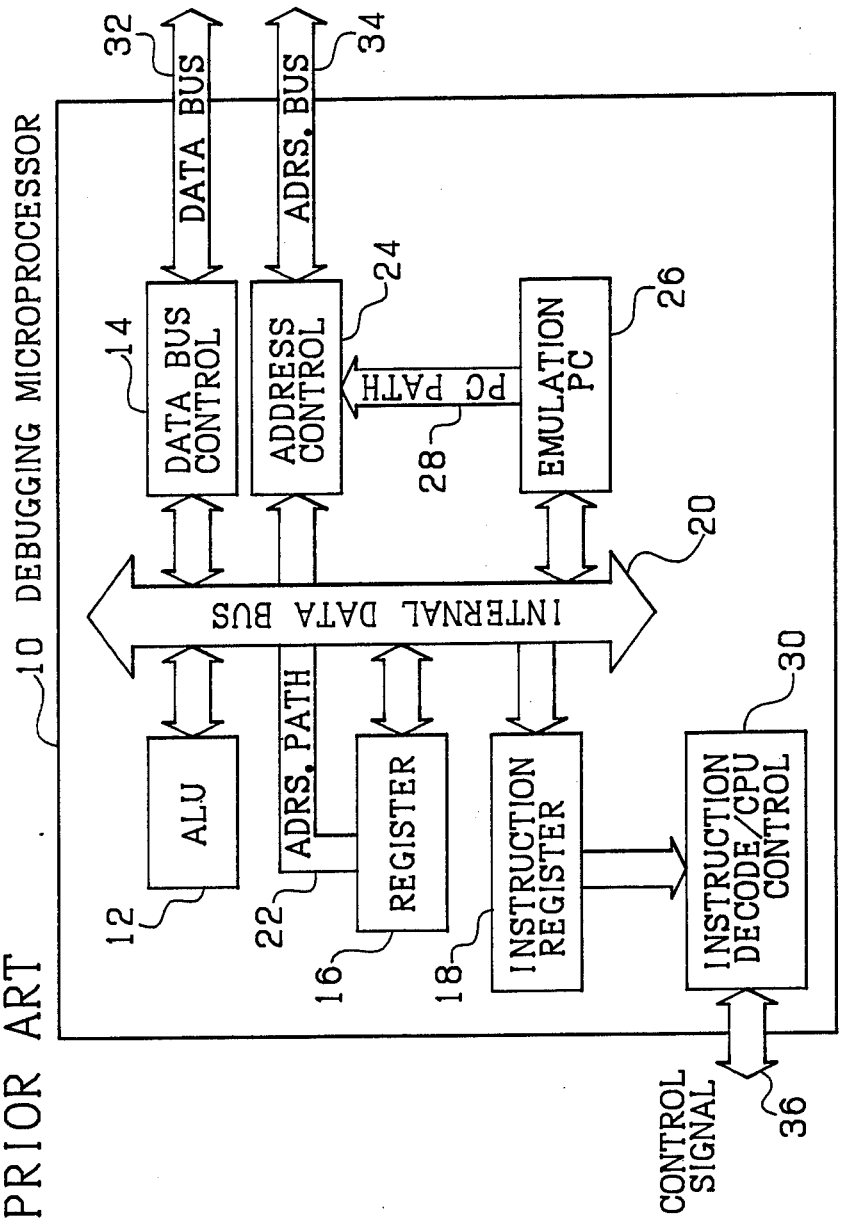
FIG. 1 is a block diagram of a conventional debugging, microprocessor.

As seen from comparison between FIGS. 1 and 3, the shown debugging microprocessor generally indicated by reference numeral 60 has a monitor program counter (PC) 62 coupled to the internal bus 20 and the PC path 28 and a PC controller 64 coupled to receive a supervisor interrupt acknowledge signal 66 and a return instruction execution signal 68 from the instruction decoder/CPU controller 30 for generating an PC switching signal 70. This PC switching signal 70 is supplied directly to the emulation PC 26 and through an inverter 72 to the monitor PC 62.

Thus, in accordance with the supervisor interrupt acknowledge signal 66 or the return instruction execution signal 68 from the instruction decode/CPU controller 30, the PC controller 64 activates or inactivates the PC switching signal 70 to selectively put one of the emulation PC 26 and the monitor PC 62 in an enabled condition Therefore, when the debugging microprocessor 60 is in the emulation mode, the emulation PC 26 is put in an enabled condition and the monitor PC 62 is put in a disabled condition. For example, in the case of reading an instruction code from an associated memory, an address outputted from the emulation PC 26 is outputted to an external bus through the address controller 24 and the address bus 34, and an instruction is read out in accordance with a control signal simultaneously outputted through the control bus 36. The read-out instruction is fetched in the instruction register 18 and the supplied to and decoded by the instruction decode/CPU controller 30. As a result, an arithmetic or logic operation may be executed in the ALU 12, or the content of the register group 19 may be rewritten. Alternatively, the content of an external memory or an input/output device may be read, or data may be written into the external memory or the input/output device. In any case, the kind of the operation is determined in accordance with the decoded content of the instruction.

Now, if a supervisor interrupt is requested through the control bus 36 to the debugging microprocessor 60, after the instruction, which wasin the course of execution when the supervisor interrupt was requested, has been executed, the instruction decoder/CPU controller 30 activates the supervisor interrupt acknoledge signal 66. At this time, if prefetched instructions exist in the instruction register 18, these instructions are cleared.

Thereafter, the PC controller 64 responds to the active supervisor interrupt acknowledge signal 66 to bring the PC switching signal 70 into an inactive condition so that the monitor PC 62 is enabled and the emulation PC 26 is disabled. At this time, in the emulation PC 26 there is preserved the program count indicative of an instruction to be executed next to the instruction which was in the course of execution when the supervisor interrupt was acknowledged.

Figure 2:
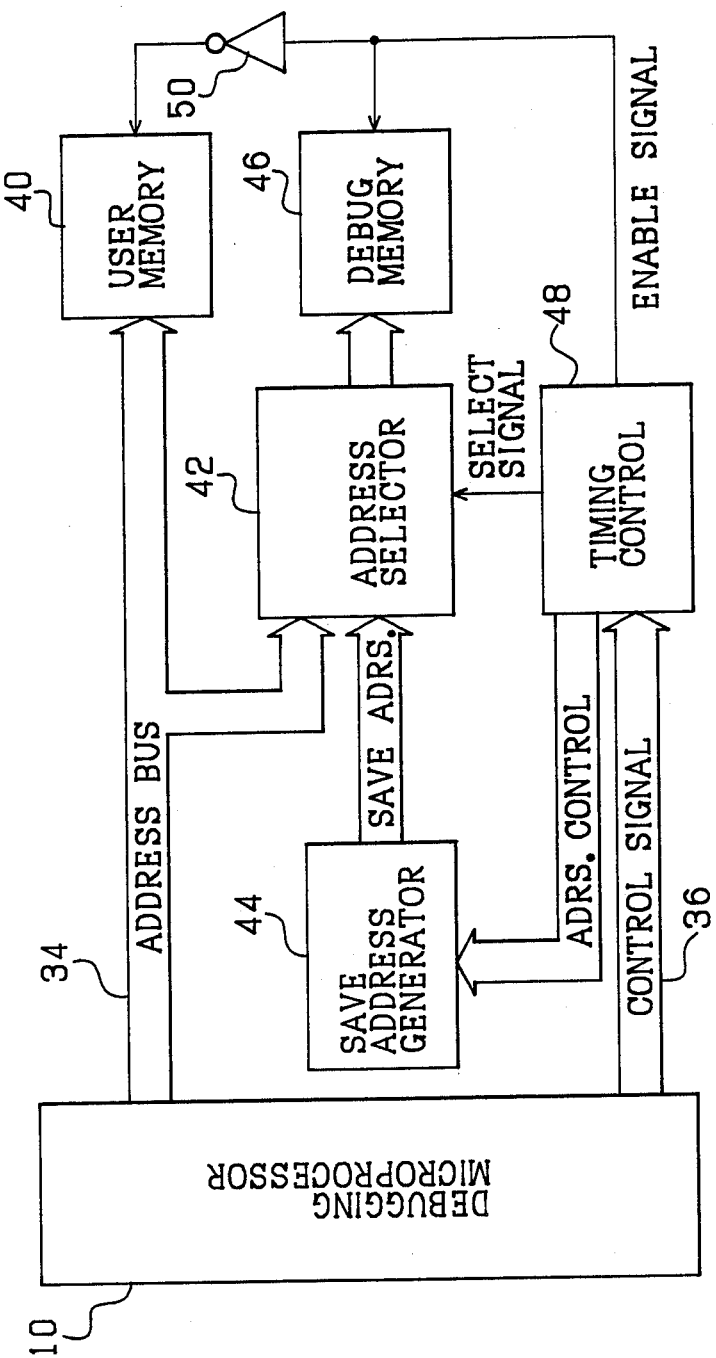
FIG. 2 is a block diagram of a save address control section of an in-circuit emulator using the conventional debugging microprocessor shown in FIG. 1.
Figure 4:
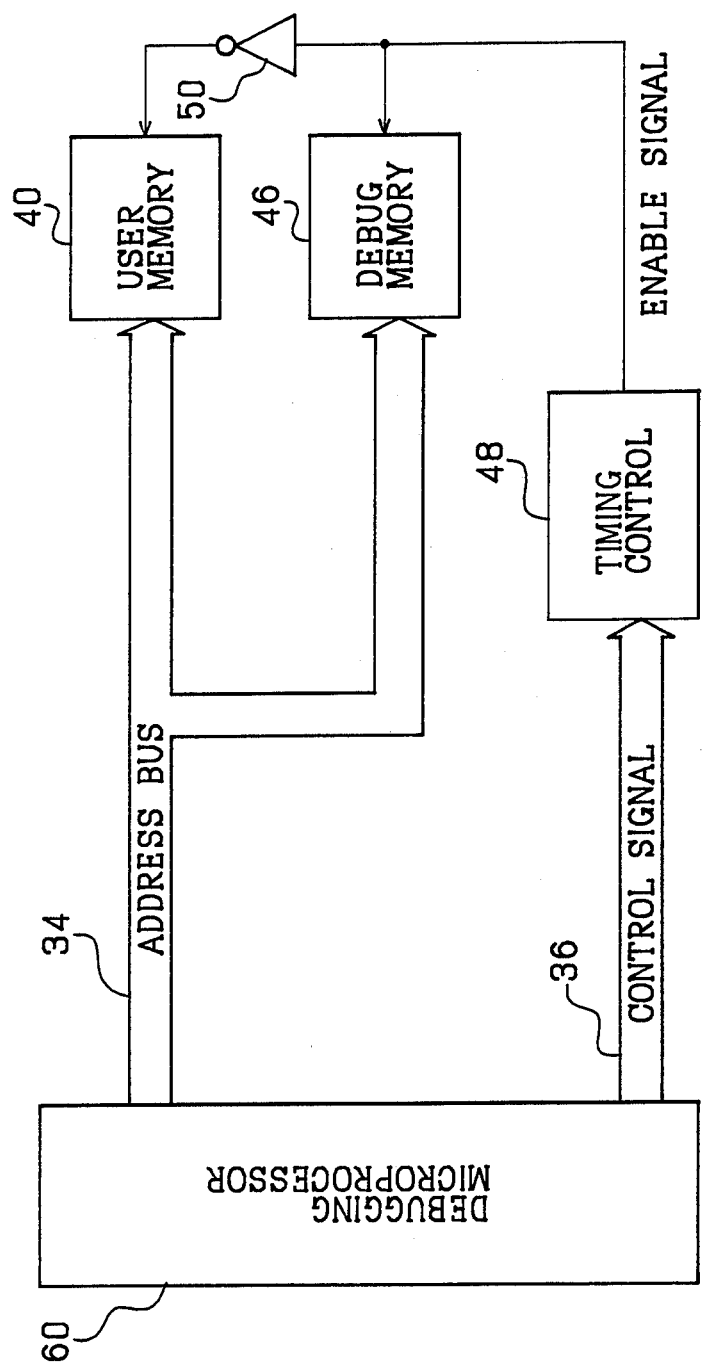
FIG. 4 is a block diagram of a wave address control section of an in-circuit emulator using the debugging microprocessor shown in FIG. 3.

Turning to FIG. 4, there is shown a block diagram of a save address control section of an in-circuit emulator using the debugging microprocessor 60 shown in FIG. 3. In FIG. 4, elements similar or corresponding to those shown in FIG. 2 are given the same reference numerals, and explanation thereof will be omitted. On the other hand, the supervisor interrupt acknowledge signal 66 is also included in the control signal on the control bus 36, and therefore, can be detected from an external stage. Accordingly, in the in-circuit emulator as shown in FIG. 4, the timing controller 48 detects the supervisor interrupt acknowledge signal 66 included in the control signal on the control bus 36, and enables the ENABLE signal so that the debug memory 46 is made accessible and the user's memory 40 is made inaccessible.

If a return instruction is generated and executed in the course of the monitor mode, the return instruction execution signal 68 is activated by the instruction decode/CPU controller 30. As a result, the PC controller 64 changes the level of the PC switching signal 70 so that the emulation PC 26 is enabled and the monitor PC 62 is disabled. At this time, in the monitor PC 62 there is preserved the program count indicative of an instruction next to the return instruction.

The return instruction execution signal 68 is also included in the control signal on the control bus 36, and therefore, can be detected from an external stage. Accordingly, in the in-circuit emulator as shown in FIG. 4, the timing controller 48 detects the return instruction execution signal 68 included in the control signal on the control bus 36, and disables the ENABLE signal so that the debug memory 46 is made inaccessible and the user's memory 40 is made accessible. As a result, the emulation mode is started from the value of the program count being preserved in the emulation PC 26 at that time.

The timing controller 48 shown in FIG. 4 can be formed of a RESET-SET flipflop receiving at the set and reset inputs the supervisor interrupt acknowledge signal 66 and the return instruction execution signal 68 so as to generate the ENABLE signal at its Q output. As seen from comparison between FIGS. 2 and 4, it will be noted that the save address control section shown in FIG. 4 is much simpler than that shown in FIG. 2.

In addition, in the shown embodiment, if there is given an instruction to modify or rewrite the content of the emulation PC 26 in the course of the monitor mode, the emulation mode can be started from any desired address.

Furthermore, as seen from the above, the mode transfer between the emulation mode and the monitor modes does not require the saving of the program counter and others in the stack area and the restoring of the data from the stack to the program counter and others.

Accordingly, in the case that the in-circuit emulator executes an emulation operation in which the emulation is stopped when an accumulator becomes "0", it is sufficient if the following program (d) is executed in the monitor mode at each step of the emulation mode:

| (d) | EMUL: | POP PSW |
| | | BRKRET |
| | INT1: | PUSH PSW |
| | | CMP ACC, 0H |
| | | JR NZ, EMUL |

From comparison between the two mentioned steps (a), (b) and (c) and the step (d), it would be understood that the reading and the writing of the program counter and the reading of the vector are omitted in the in-circuit emulator using the debugging microprocessor in accordance with the present invention, and therefore, the emulation mode can be executed at a high speed.

Figure 5:
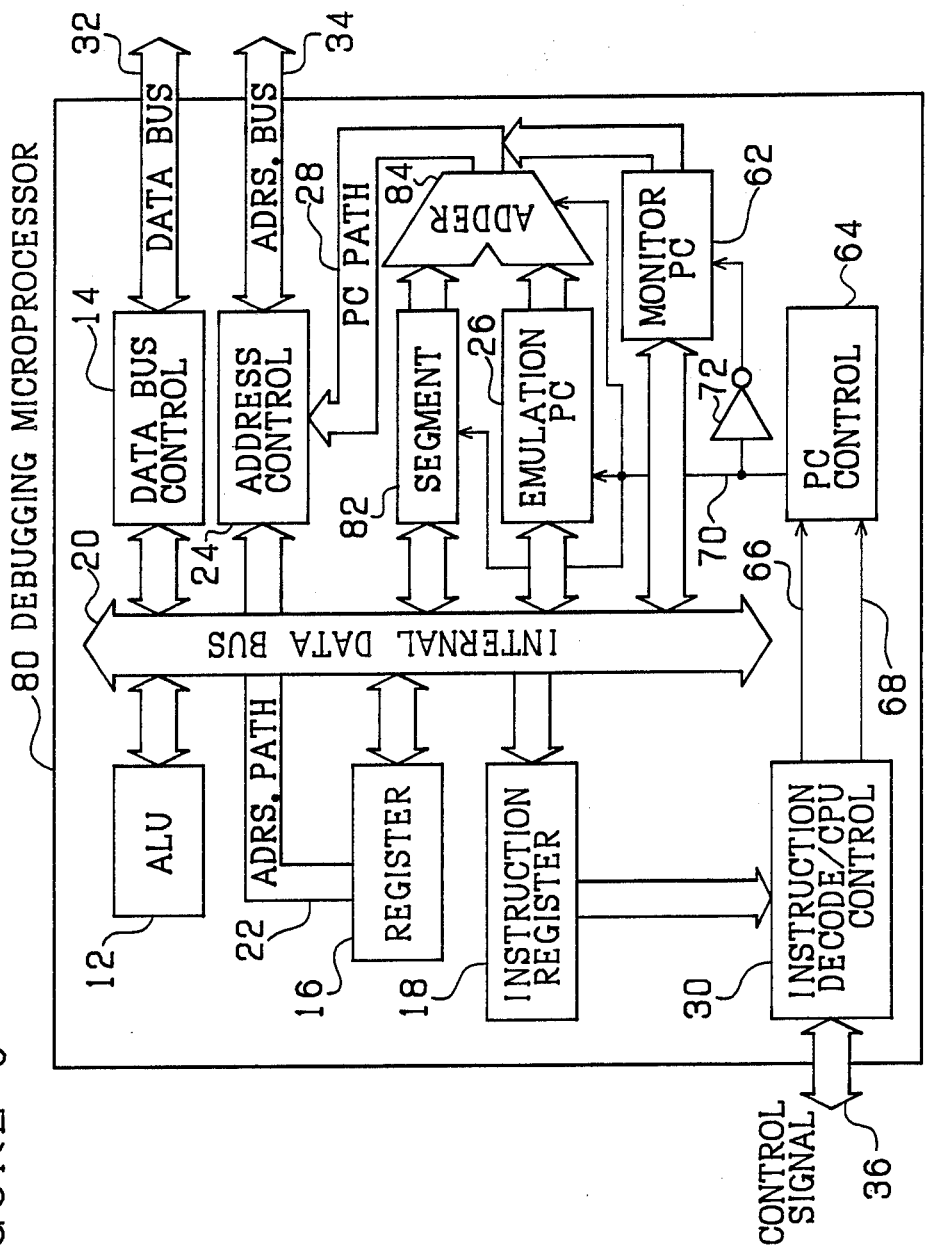
FIG. 5 is a block diagram of another embodiment of the debugging microprocessor in accordance with the present invention.

Referring to FIG. 5, there is shown a block diagram of one embodiment of the debugging microprocessor in accordance with the present invention. In FIG. 5, elements similar or corresponding to those shown in FIG. 3 are given the same reference numerals, and explanation thereof will be omitted.

As seen from comparison between FIGS. 3 and 5, the shown debugging microprocessor generally indicated by Reference Numeral 80 has a segment 82 coupled to the internal bus 20 and an adder 84 having a pair of inputs respectively coupled to the emulation PC 26 and the segment 82 for outputting an added value through the PC path 28 for the address controller 24 and hence the address bus 34. Therefore, the monitor PC 62 has the same bit number so that of the added value outputted from the adder 84.

For example, even if the emulation PC 26 has a bit length of 16 bits, if the address obtained from the addition of the segment 82 and the emulation PC 26 has a bit length of 20 bits, the monitor PC 62 has a bit length of 20 bits. With this arrangement mentioned above, therefore, even if the content of the segment 82 is changed in the course of the emulation mode, the destination for the supervisor interrupt request becomes the address itself held in the monitor 62, and therefore, the mode transfer between the emulation mode and the monitor mode can be performed similarly to the first embodiment shown in FIG. 3.

As seen from the above description of the embodiments, the debugging microprocessor in accordance with the present invention is characterized by the internal provision of the emulation PC and the monitor PC so that the program count is switched from the emulation PC to the monitor PC at the time of the supervisor interrupt processing and then from the monitor PC to the emulation PC at the time of the return instruction execution. Therefore, access to the stack area is not needed at the time of the mode transfer between the emulation mode and the monitor mode. Accordingly, the circuit for the address switching to the save area, which was required in the conventional in-circuit emulator, can be greatly simplified.

In addition, since the access to the stack area is not needed at the time of the mode transfer as mentioned above, the switching time can be greatly reduced, and therefore, the one step continuous execution time of the emulation mode can also be greatly reduced.

The invention has thus been shown and described with reference to the specific embodiments. However, it should be noted that the present invention is in no way limited to the details of the illustrated structures but changes and modifications may be made within the scope of the appended claims.

I claim:

1. A debugging microprocessor for moving into a debugging interrupt processing execution mode in response to an external supervisor interrupt instruction, comprising an execution controller for generating a supervisor interrupt acknowledge signal after an execution of an instruction being executed when a reception of a supervisor interrupt request has been completed, and also for generating a return instruction execution signal when a return instruction has been executed, a first program counter put in an operating condition when said microprocessor is in a user's program execution mode, a second program counter put in an operating condition when said microprocessor is in a debugging interrupt processing execution mode, a program counter controller coupled to receive said supervisor interrupt acknowledge signal and said return instruction execution signal and also coupled to said first and second program counters for controlling said first and second program counters, said program counter controller responding to the said supervisor interrupt acknowledge signal to disable said first program counter and to enable said second program counter so as to cause the content of said second program counter to be outputted as an address for a debug memory, and also responding to said return instruction execution signal to disable said second program counter and to enable said first program counter so as to cause the content of said first program counter to be outputted as an address for a user memory, and an address controller coupled to said first and second program counters so as to execute an instruction fetch cycle on the basis of an address outputted from an enabled one of said first and second program counters so that an instruction read in the instruction fetch cycle is fetched through an external bus and through an internal bus to a register and decoded so as to be executed, so that the content of the first program counter can be accessed in the course of the debugging interrupt processing operation.

2. A debugging microprocessor claimed in claim 1 wherein said address controller is coupled to an external address bus which is also coupled to said debug memory and said user memory, so that the content of said second program counter is outputted through said address controller and said external address bus to said debug memory at the time of executing said external supervisor interrupt instruction and the content of said first program counter is outputted through said address controller and said external address bus to said user memory at the time of executing said return instruction.

3. A debugging microprocessor claimed in claim 2 further including a segment and an adder coupled to receive and add the content of said segment and the content of said second program counter for generating an address for said debug memory.

4. A debugging microprocessor for moving into a debugging interrupt processing execution mode in response to an external supervisor interrupt instruction, comprising an execution controller for generating a supervisor interrupt acknowledge signal after an execution of an instruction being executed when reception of a supervisor interrupt request has been completed, and also for generating a return instruction execution signal when a return instruction has been executed, a first program counter put in an operating condition when said microprocessor is in a user's program execution mode, a second program counter put in an operating condition when said microprocessor is in a said debugging interrupt processing execution mode, a segment for generating a portion of an address of a debug memory, and an adder coupled to receive and add the content of said segment and the content of said second program counter for generating a completed address for said debug memory, a program counter controller coupled to receive said supervisor interrupt acknowledge signal and said return instruction execution signal and also coupled to said first and second program counters, said segment and said adder for controlling said first and second program counters, said segment and said adder, said program counter controller responding to said supervisor interrupt acknowledge signal to disable said first program counter and to enable said second program counter, said segment and said adder so as to cause an output of said adder to be outputted as the address for said debug memory, and also responding to said return instruction execution signal to disable said second program counter, said segment and said adder and to enable said first program counter so as to cause the content of said first program counter to be outputted as an address for a user memory, and an address controller coupled to said first and second program counters so as to execute an instruction fetch cycle on the basis of an address outputted from an enabled one of said first and second program counters so that an instruction read in said instruction fetch cycle is fetched through an external bus and through an internal bus to a register and decoded so as to be executed.

* * * * *